(12) United States Patent
Jin et al.

(10) Patent No.: US 11,449,355 B2
(45) Date of Patent: Sep. 20, 2022

(54) NON-VOLATILE MEMORY (NVM) BASED METHOD FOR PERFORMANCE ACCELERATION OF CONTAINERS

(71) Applicant: Huazhong University of Science and Technology, Hubei (CN)

(72) Inventors: Hai Jin, Hubei (CN); Song Wu, Hubei (CN); Qizhi Tang, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 396 days.

(21) Appl. No.: 16/773,004

(22) Filed: Jan. 27, 2020

(65) Prior Publication Data

US 2020/0334066 A1 Oct. 22, 2020

(30) Foreign Application Priority Data

Apr. 18, 2019 (CN) .......................... 201910312053.X

(51) Int. Cl.
*G06F 9/455* (2018.01)
*G06F 8/60* (2018.01)
*G06K 9/62* (2022.01)

(52) U.S. Cl.
CPC ............ *G06F 9/45558* (2013.01); *G06F 8/60* (2013.01); *G06K 9/6267* (2013.01); *G06F 2009/4557* (2013.01); *G06F 2212/1041* (2013.01)

(58) Field of Classification Search
CPC ................... G06F 9/45558; G06F 8/60; G06F 2009/4557; G06K 9/6267
See application file for complete search history.

(56) References Cited

U.S. PATENT DOCUMENTS

| | | | | |
|---|---|---|---|---|
| 2010/0262638 | A1* | 10/2010 | Fitzgerald | G06F 9/4401 707/822 |
| 2018/0052637 | A1* | 2/2018 | Chen | G06F 12/0246 |
| 2018/0196654 | A1* | 7/2018 | Bo | G06F 9/45533 |
| 2018/0341471 | A1* | 11/2018 | Stefanov | G06F 8/63 |
| 2020/0366655 | A1* | 11/2020 | Sun | H04L 63/0807 |
| 2021/0011885 | A1* | 1/2021 | Liu | G06F 8/63 |

\* cited by examiner

*Primary Examiner* — Jacob D Dascomb

(74) *Attorney, Agent, or Firm* — Michael X. Ye; Rimon, PC

(57) ABSTRACT

The present disclosure discloses a NVM-based method for performance acceleration of containers. The method comprises classifying each image layer of mirror images as either an LAL (Layer above LDL) or an LBL (Layer below LDL) during deployment of containers; storing the LALs into a non-volatile memory and selectively storing each said LBL into one of the non-volatile memory and a hard drive; acquiring hot image files required by the containers during startup and/or operation of the containers and storing the hot image files required by the containers into the non-volatile memory; and sorting the mirror images in terms of access frequency according to at least numbers of times of access to the hot image files so as to release the non-volatile memory currently occupied by the mirror image having the lowest access frequency when the non-volatile memory is short of storage space.

6 Claims, 2 Drawing Sheets

NON-VOLATILE MEMORY (NVM) BASED METHOD FOR PERFORMANCE ACCELERATION OF CONTAINERS

FIELD

The present invention relates to the field of virtualization, and more particularly to optimization of Docker in an NVM-based virtualization environment so as to accelerate deployment and startup of containers with reduced writing wear and usage to NVMs (Non-Volatile Memories), and even more particularly to an NVM-based method for performance acceleration of containers.

DESCRIPTION OF RELATED ART

After the advent of virtualization, container-related technologies have gradually become the most significant, revolutionary technologies in the field of cloud computation. As a trend, more and more effort, research, development and promotion have been made for container-related technologies and their applications in recent years, making these technologies grow rapidly and become a major part of cloud computation. Container-based virtualization is a lightweight method that facilitates resource isolation and management in Linux environments. The use of containers is similar to the used of virtual machines for providing a relatively independent operation environment, but has better resources operation efficiency as compared to a VM-based approach.

Docker is an open-source application container engine, or, a management framework that facilitates creation and deployment of containers. With this, an application developer can pack application and dependency packages to a portable container, and then publish the portable container to any machine to accomplish publication of an application. Moreover, Docker can be used in virtualization, wherein containers use the sandbox mechanism completely and are isolated from each other.

Docker containers are generated based on mirror images. A mirror image is a special, independent file system, which contains all the files required for container operation. Stated differently, a mirror image may have a unified perspective composed of layer files of multiple read-only image layers, wherein every image layer comprises plural files and metadata. For example, Tomcat server mirror image comprises all the codes, runtime tools, system tools and system dependencies essential to server operation.

Docker is of a typical CS architecture and runs daemon in every host machine to receive and process user commands from terminals. The term "CS architecture" is also referred to as a Client/Server architecture, which is a well-known software system architecture. A CS architecture allocates tasks reasonably between Client and Server so as to reduce system communication overhead, and it requires installation of Client to conduct management. Daemon is an always-on server process that is usually run as a system service in the background and has no control terminal so it does not interact with the foreground.

Docker uses Cgroups and Namespaces provide by Linux to ensure resource utilization constraints and resource isolation. "Cgroup" is the abbreviate of a "control group," and is a mechanism provided in a Linux kernel for limiting, logging, and isolating physical resources used by process groups. A namespace is a set of symbols that are used to organize objects. It is modularized and applicable to individual inherited process. There are seven namespace in total to restrict the access scope of a process. As the use of containers is advantageous in terms of lightweightness, continuous integration, version control and portability, Docker has been extensively used in the industry.

However, slowness of disk I/O brings limitation to container deployment and startup. When pulling mirror images, a container exhibits features including simultaneous downloading, successive downloading, and successive storing among three threads. Due to the three features, in the process of pulling mirror images, when all the mirror images have been fully downloaded, there will be a large part of mirror images waiting to be stored in the hard drive, resulting in very high latency and I/O burst. Containerization is in nature a process of enjoying virtualization of all resources, but in practice the slowness of disk I/O delays startup of containers. Containerization applications require full initialization of file systems, comprising application binary files, complete Linux distributions and packages they depend on.

NVMs (Non-Volatile Memories) bring about new opportunities of accelerating container deployment and startup. Novel NVMs are now used to enhance performance of containers. While NVMs do have advantages such as non-volatility, high capacity, good reading/writing performance and capability of byte addressing, they bring about new challenges. NVMs have limited write endurance and much smaller capacity as compared to disks, making it necessary to combine NVM and Docker reasonably and effectively.

Currently, there are two methods used in the industry to accelerate non-local deployment and startup of containers.

The first method to accelerate deployment and startup of non-local containers involves simplified mirror images. Particularly, Docker uses small base image distributions. For example, China Patent Application Publication No. CN108446166A discloses a fast startup method for virtual machines, which includes: in response to a request for startup of an application creating a simplified Linux virtual machine mirror image of the application using an automated build system, or creating a single address space machine mirror image for the application using a tiny operating system, wherein the Linux virtual machine mirror image or the single address space machine mirror image is characterized in: only containing functions required for startup of the application and taking a memory space smaller than the container memory; and the Linux virtual machine mirror image is further characterized in that: the Linux virtual machine mirror image is a virtual machine composed of Linux distributions and optimized Linux kernels. The prior-art method optimizes virtual machine performance for faster startup and smaller memory overhead as compared to container engines, thereby providing both good container isolation and lightweight virtual machines. However, the method in fact requires the costs of reduced compatibility and limited yield.

The second method is to have mirror images share a base image, thereby downsizing the mirror images. Specifically, when downloading Docker mirror images, we can see every layer coming with an ID. This is the concept of "layer," which is important to union file systems. A union file system is a layered, lightweight, high-performance file system. It can take modifications to a file system as submissions and stack them layer by layer, and can mount different directories to the same virtual file system. A union file system is a basic element of a Docker mirror image. Inheritance of mirror images can be down by layer, and based on a base image (without a parent mirror image), various specific application mirror images can be made. In this way, different Docker containers can share some basic file system layers, and add their respective, unique change layers, so as to downsize mirror images. However, in practice, different users use different distributions of the base image, and users after all need to download the whole mirror image.

In view of this, the known method is not as effective as asserted and has numerous restrictions. Hence, it is desirable to make improvement based on the prior art.

SUMMARY OF THE INVENTION

To address the shortcomings of the prior art, the present invention provides an NVM-based performance acceleration method for containers. The present invention, according to the traits of container deployment and startup and the good properties of NVMs, accelerates container deployment and startup by storing a part of mirror images to an NVM, with reduced writing wear and usage to the NVM, so as to address the problem about slow container deployment and startup seen in the traditional architecture due to restrictions caused by disk I/O. What is crucial is that the present invention enhances container performance by improving the storage architecture, so as to significantly accelerate deployment and startup of containers built based on mirror images of any version.

According to one mode, a computation system, comprising: at least one processor; at least one storage; and at least one command, being stored in the at least one storage and configured to be executed by the at least one processor for operation; wherein, the operation comprises: classifying each image layer of mirror images as either an LAL (Layer above LDL) or an LBL (Layer below LDL) during deployment of containers; storing the LALs into a non-volatile memory and selectively storing each said LBL into one of the non-volatile memory and a hard drive; acquiring hot image files required by the containers during startup and/or operation of the containers and storing the hot image files required by the containers into the non-volatile memory; and sorting the mirror images in terms of access frequency according to at least numbers of times of access to the hot image files so as to release the non-volatile memory currently occupied by the mirror image having the lowest access frequency when the non-volatile memory is short of storage space.

According to one mode, the step of classifying each image layer of mirror images as either an LAL or an LBL during deployment of containers comprises: finding an LDL (Last Download Layer) during deployment of the containers according to download states of the image layers; and classifying the mirror images into the LALs and the LBLs using the LDL as boundary; wherein, the LDL and the image layers above the LDL are classified as the LALs, and the image layers below the LDL are classified as the LBLs.

According to one mode, the step of finding an LDL during deployment of the containers according to download states of the image layers comprises: building a double linked list, in which each node represents one said image layer that is being downloaded; once the relevant image layer has been fully downloaded, and the double linked list has a length greater than one, deleting the node that corresponds to the image layer from the linked list; and when the whole mirror image has been pulled, and there is eventually one said node left in the double linked list, determining that the relevant image layer is the LDL.

According to one mode, the step of storing the LALs into a non-volatile memory and selectively storing each said LBL into one of the non-volatile memory and a hard drive comprises: analyzing a DockerFile corresponding to each said LBL so as to identify a status of a specific mirror image file contained in the relevant LBL; selectively storing the LBL to the hard drive if analysis of the DockerFile corresponding to the relevant LBL indicates that the relevant LBL does not contain any said specific mirror image files; and/or selectively storing the LBL into the non-volatile memory if analysis of the DockerFile corresponding to the relevant LBL indicates that the relevant LBL does contain a said specific mirror image file.

According to one mode, the step of analyzing a DockerFile corresponding to each said LBL so as to identify a status of a specific mirror image file contained in the relevant LBL comprises: first analyzing command contained in the DockerFile corresponding to each said LBL; if there is any said command of a first type contained in the DockerFile corresponding to the relevant LBL, taking that LBL as a candidate LBL; if there is no said command of that first type contained in the DockerFile corresponding to the relevant LBL, determining that the relevant LBL does not contain any specific mirror image file; analyzing types of files in the DockerFile corresponding to each said selected candidate LBL; if the DockerFile corresponding to the relevant LBL among the candidate LBLs does not contain any execution engine and application file, determining that the relevant LBL does not contain a specific mirror image file; and if the DockerFile corresponding to the relevant LBL among the candidate LBLs does contain an execution engine and/or an application file, determining that the relevant LBL does contain the specific mirror image file; wherein the command of the first type is a command configured to modify contents of the mirror images to generate new image layers.

According to one mode, the step of first analyzing the command contained in the DockerFile corresponding to each said LBL comprises: acquiring a context for execution of the command through a Docker daemon, and creating a buildFile object; reading the DockerFile; and performing line-by-line analysis on the DockerFile so as to determine the status of the specific mirror image file contained in the relevant LBL according to the command and contents of the DockerFile.

According to one mode, the step of acquiring hot image files required by the containers during startup and/or operation of the containers and storing the hot image files required by the containers into the non-volatile memory comprises: identifying the file and file dependencies necessary for startup and/or operation of the mirror images by means of monitoring system calling, monitoring file variation, monitoring directory variation and monitoring progress during startup and/or operation of the container; and taking the file and file dependencies necessary for startup and/or operation of the mirror images just identified as the hot image file required by the container.

According to one mode, the step sorting the mirror images in terms of access frequency according to at least numbers of times of access to the hot image files so as to release the non-volatile memory currently occupied by the mirror image having the lowest access frequency when the non-volatile memory is short of storage space comprises: counting how many times the hot image files corresponding to each said mirror image are accessed in a sampling cycle; recording magnitude of the hot image files of each said mirror image; calculating a unit magnitude access ratio $R_{HS}$ of the hot image files of each mirror image; sorting the mirror images in terms of access frequency according to the unit magnitude ratio $$R_{HS} = \frac{Ti}{Si};$$

and releasing the non-volatile memory currently occupied by the mirror image having the lowest access frequency when the non-volatile memory is short of storage space; where Ti is access a total number of the times all the hot image file s of the relevant mirror image have been accessed, and Si is a total magnitude of all the hot image files of the relevant mirror image that have been accessed.

According to one mode, a NVM-based method for performance acceleration of containers, wherein the method comprises: classifying each image layer of mirror images as either an LAL (Layer above LDL) or an LBL (Layer below LDL) during deployment of containers; storing the LALs into a non-volatile memory and selectively storing each said LBL into one of the non-volatile memory and a hard drive; acquiring hot image files required by the containers during startup and/or operation of the containers and storing the hot image files required by the containers into the non-volatile memory; and sorting the mirror images in terms of access frequency according to at least numbers of times of access to the hot image files so as to release the non-volatile memory currently occupied by the mirror image having the lowest access frequency when the non-volatile memory is short of storage space.

According to one mode, the step of classifying each image layer of mirror images as either an LAL or an LBL during deployment of containers comprises: finding an LDL (Last Download Layer) during deployment of the containers according to download states of the image layers; and classifying the mirror images into the LALs and the LBLs using the LDL as boundary; wherein, the LDL and the image layers above the LDL are classified as the LALs, and the image layers below the LDL are classified as the LBLs.

According to one preferred mode, a computation system comprises: at least one processor, at least one storage, and at least one command. The at least one command is stored in the at least one storage and is configured to be executed by the at least one processor for operation. The operation includes: storing LALs into a non-volatile memory, selectively storing LBLs containing specific mirror image files into the non-volatile memory, and storing LBLs not containing specific mirror image files into a hard drive; and during startup and/or operation of the container, acquiring hot image files required by the container and storing the hot image file required by the container into the non-volatile memory.

According to one preferred mode, the operation may include: where a DockerFile in the relevant LBL contains not only a first type of commands but also at least one of an execution engine and an application file, determining that the relevant LBL comprises the specific mirror image file.

According to one preferred mode, the command of the first type is a command configured to modify contents of the mirror images to generate new image layers.

According to one preferred mode, LDL and the image layers above the LDL are classified as the LALs, and the image layer below the LDL are classified as the LBL.

According to one preferred mode, when the whole mirror image has been pulled, and there is eventually one said node left in the double linked list, determining that the relevant image layer is the LDL.

DETAILED DESCRIPTION OF THE INVENTION

Figure 1:
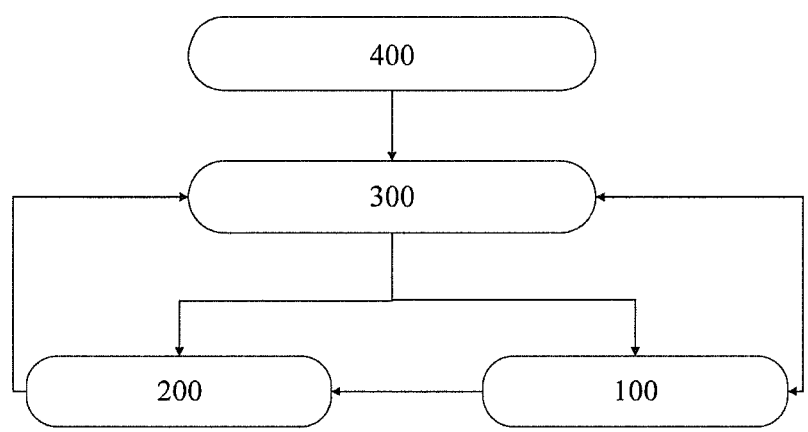
FIG. 1 is a structural module diagram according to one preferred mode of the present invention.

The invention as well as a preferred mode of use, further objectives and advantages thereof will be best understood by reference to the following detailed description of illustrative embodiments when read in conjunction with the accompanying drawings.

Some terms used in the present disclosure shall have the following definitions.

A non-volatile memory is also referred to as an NVM, or a non-volatile storage. It is non-volatile and accessible by byte, and has high storage density, low power consumption, and reading/writing performance comparable to DRAMs. But NVMs have incommensurate reading and writing speeds and limited lifetime.

A Docker file is a text file comprising commands that make up mirror images. Docker automatically generates a mirror image by reading commands in a Docker file.

A buildFile object is a component of a Docker daemon 500. It conducts build operation according to commands in a DockerFile to generate a relevant image layer 810. In other words, a buildFile object may be considered as a workshop that produces mirror images. With input of raw materials, the workshop can produce Docker mirror images as required by users. In this case, the raw materials are DockerFiles.

Container deployment may refer to a process through which a container downloads a mirror image from Docker Hub and stores it.

Container startup may refer to a process through which a container creates a dynamic container based on a static mirror image.

A specific mirror image file may refer to a coarse-grained hot image file. Coarse-grained hot image files have redundancy and comprise only the most hot image files. In a DockerFile of the relevant LBL 810, where there are not only the first-type commands but also at least one of an execution engine and an application file, it indicates that the relevant LBL 810 comprises specific mirror image files.

A hot image file refers to a mirror image file necessary for container startup. It is to be noted that not every file in a mirror image is required for startup. Severe hot image files are those essential to container startup.

A cold mirror image file may refer to a file in a mirror image that is not required for a container startup and has relatively low use frequency.

Embodiment 1

The present embodiment discloses a computation system, or a system that is based on a heterogeneous memory and can accelerate deployment and startup of containers, or an NVM-based system for accelerating container performance, or a computation system that can accelerate container deployment and startup, or an NVM-based computation system that can enhance performance of containers. The disclosed system is suitable for executing steps of the method of the present invention so as to achieve expected technical effects. Without causing conflicts or contradictions, a part of and/or the entire of a preferred mode of other embodiments can be used as complements to the present embodiment. The system may be, for example, at least one of a general computer, a server and a server cluster. The computer may be a cloud computer. The server may be a cloud server. The server cluster may be a cloud server cluster.

According to one mode, the system may comprise at least one processor; at least one storage; and at least one command, being stored in the at least one storage and configured to be executed by the at least one processor for operation.

Figure 2:
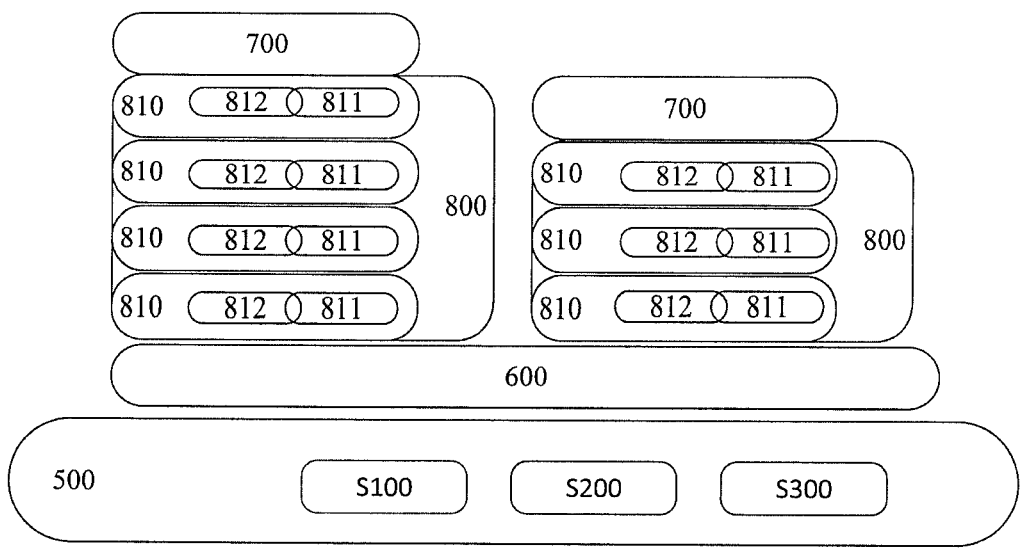
FIG. 2 is a functional module diagram according to one preferred mode of the present invention.

According to one mode, the operation comprises: classifying each image layer 810 of mirror images as either an LAL 810 (Layer above LDL) or an LBL 810 (Layer below LDL) during deployment of containers 700; storing the LALs 810 into a non-volatile memory 100 and selectively storing each said LBL 810 into one of the non-volatile memory 100 and a hard drive 200; acquiring hot image files 811 required by the containers 700 during startup and/or operation of the containers 700 and storing the hot image files 811 required by the containers 700 into the non-volatile memory 100; and sorting the mirror images in terms of access frequency according to at least numbers of times of access to the hot image files 811 so as to release the non-volatile memory 100 currently occupied by the mirror image having the lowest access frequency when the non-volatile memory 100 is short of storage space. Preferably, the foregoing operations may be performed by a Docker daemon 500 in the system. It means that optimization based on the present invention can be done in the Docker daemon 500, ensuring transparency of Docker. Referring to FIG. 1, operation memory 300 may pull images 800 from a mirror image library 400. Referring to FIG. 2, the Docker daemon 500 is realized on the basis of Cgroups and Namespaces of a kernel 600. The mirror images 800 may be built on the kernel 600. The kernel 600 may be understood as a core program. Each mirror image 800 may comprise a plurality of image layers 810. The containers 700 are created on the basis of the mirror images 800. This means that the process in the container 700 depends on the files in the mirror images. Herein, the files include executable files, dependency software, library files, configuration files, and other files required by the process. Preferably, during deployment of the containers 700, every image layer 810 of a mirror image 800 is classified as either an LAL 810 or an LBL 810 by, for example, modifying the mirror image download and management module pullRepository of the Docker daemon 500. Preferably, during startup and/or operation of the containers 700, the hot image files 811 required by the containers 700 are acquired and stored into the non-volatile memory 100. This may be achieved by modifying the mirror image storage and management module graph of the Docker daemon 500. The present invention by using the disclosed method can at least provide the following technical benefits. First, the present invention optimizes the mechanism of deployment of containers 700 and integrates the non-volatile memory 100 to significantly accelerate deployment of the containers 700. Second, the present invention optimizes the storage mechanism for mirror images, and stores the hot image files 811 into the non-volatile memory 100, thereby significantly accelerating startup of the containers 700. Third, the present invention stores a part of the mirror images 800 into the non-volatile memory 100 during deployment of the containers 700, and eventually only the hot image files 811 are stored in the non-volatile memory 100, thereby significantly reducing writing wear to and space occupancy in the non-volatile memory 100. Fourth, the present invention only modifies the Docker system architecture to provide versatility and transparency by supporting extensive workflows, without the need of application-level medication.

According to one mode, the step of classifying each image layer of mirror images as either an LAL 810 or an LBL 810 during deployment of containers 700 comprises: finding an LDL 810 (Last Download Layer) during deployment of the containers 700 according to download states of the image layers 810; and classifying the mirror images into the LALs 810 and the LBLs 810 using the LDL 810 as boundary; wherein, the LDL 810 and the image layers above the LDL 810 are classified as the LALs 810, and the image layers below the LDL 810 are classified as the LBLs 810. By using the disclosed method, the present invention at least provides the following technical benefits: LALs 810 are the crux of occurrence of latency. The present invention differentiates LBLs 810 from LBLs 810, and stores the LALs 810 into the non-volatile memory 100, thereby accelerating deployment and startup of the containers 700.

According to one mode, the step of finding an LDL 810 during deployment of the containers 700 according to download states of the image layers 810 comprises: building a double linked list, in which each node represents one said image layer 810 that is being downloaded; once the relevant image layer 810 has been fully downloaded, and the double linked list has a length greater than one, deleting the node that corresponds to the image layer 810 from the linked list; and when the whole mirror image has been pulled, and there is eventually one said node left in the double linked list, determining that the relevant image layer 810 is the LDL 810. By using the disclosed method, the present invention at least provides the following technical benefits. First, the use of a double linked list for deletion of nodes provides improved efficiency. Second, the use of a double linked list facilitates traversal by enabling traversal of the linked list in both directions.

According to one mode, the step of storing the LALs 810 into a non-volatile memory 100 and selectively storing each said LBL 810 into one of the non-volatile memory 100 and a hard drive 200 comprises: analyzing a DockerFile corresponding to each said LBL 810 so as to identify a status of a specific mirror image file 812 contained in the relevant LBL 810; selectively storing the LBL 810 to the hard drive if analysis of the DockerFile corresponding to the relevant LBL 810 indicates that the relevant LBL 810 does not contain any said specific mirror image files 812; and/or selectively storing the LBL into the non-volatile memory 100 if analysis of the DockerFile corresponding to the relevant LBL 810 indicates that the relevant LBL 810 does contain a said specific mirror image file 812. In the prior art, mirror images are stored in a layer sequence, meaning that the first layer is first stored, and then the second layer, and this is totally different from the present invention. By using the disclosed method, the present invention can at least provide the following technical benefits. First, in virtue of the good reading/writing properties of the non-volatile memory 100, deployment of the containers 700 can be accelerated. Second, in virtue of the good reading/writing properties of the non-volatile memory 100, startup of the containers 700 can be accelerated.

According to one mode, the step of analyzing a DockerFile corresponding to each said LBL 810 so as to identify a status of a specific mirror image file 812 contained in the relevant LBL 810 comprises: first analyzing command contained in the DockerFile corresponding to each said LBL 810; if there is any said command of a first type contained in the DockerFile corresponding to the relevant LBL 810, taking that LBL 810 as a candidate LBL 810; if there is no said command of that first type contained in the DockerFile corresponding to the relevant LBL 810, determining that the relevant LBL 810 does not contain any specific mirror image file 812; analyzing types of files in the DockerFile corresponding to each said selected candidate LBL 810; if the DockerFile corresponding to the relevant LBL 810 among the candidate LBLs 810 does not contain any execution engine and application file, determining that the relevant LBL 810 does not contain a specific mirror image file 812; and if the DockerFile corresponding to the relevant LBL 810 among the candidate LBLs 810 does contain an execution engine and/or an application file, determining that the relevant LBL 810 does contain the specific mirror image file 812; wherein the command of the first type is a command configured to modify contents of the mirror images 810 to generate new image layers. For example, the commands of the first type modify the type of the file system of the previous image layer 810. The commands of the first type may be, for example, at least one of FROM, ADD, COPY, RUN and ONBUILD. The commands of the second type only modify configuration files without generating new image layers 810. For example, the commands of the second type only modify config information of the mirror image. The commands of the second type may be, for example, at least one of ENV, EXPOSE, CMD, LABEL, MAINTAINER, ENTRYPOINT, VOLUM, USER, WORKDIR, ARG, STOPSIGNAL and HEALTHCHECK. By using the disclosed method, the present invention can at least provide the following technical benefits. First, the present invention performs primary analysis on DockerFile to obtain candidate LBLs containing commands of the first type, and then performs secondary analysis on DockerFile to filter out the candidate LBLs not containing execution engines and application files, so as to identify the LBLs containing hot image files 811. By doing this, the image layers 810 in the LBLs subject to frequent use can be identified more accurately and stored into the non-volatile memory 100, so as to enhance the performance of the containers 700 and facilitate deployment of the containers 700. Second, the first analysis of DockerFIle helps to identify the LBLs containing specific mirror image files, and thereby accelerate first startup of the containers 700. Since the non-volatile memory 100 already contains specific mirror image files that are coarse-grained hot image file, fewer data have to be read from the hard drive 200 for starting up a container. Third, only the hot image files 811 are stored into the non-volatile memory 100 at last, and this significantly reduces space occupancy in the non-volatile memory 100.

According to one preferred mode, the step of analyzing commands contained in DockerFile corresponding to each LBL 810 comprises:

Acquiring a context for execution of the command through a Docker daemon 500, and creating a buildFile object. A buildFile object is a component of a Docker daemon 500. It conducts build operation according to commands in a DockerFile to generate a relevant image layer 810. In other words, a buildFile object may be considered as a workshop that produces mirror images. With input of raw materials, the workshop can produce Docker mirror images as required by users. In this case, the raw materials are DockerFiles.

Reading the DockerFile.

Performing line-by-line analysis on the DockerFile so as to determine the status of the specific mirror image file 812 contained in the relevant LBL 810 according to the command and contents of the DockerFile. By using the disclosed method, the present invention at least provides the following technical benefits. First, the present invention ascertains the contents of the image layers 810 simply by analyzing DockerFile, and this eliminates the need of scanning and analyzing the image layers 810, thereby providing significantly improved efficiency. Second, the present invention ascertains the contents of the image layers 810 simply by analyzing DockerFile, and this provides prophetic knowledge about the contents of the image layers 810 before downloading of the mirror image 800. As the prophetic knowledge satisfies technical precondition for static analysis, startup of the containers 700 can be accelerated.

According to one mode, the step of acquiring hot image files 811 required by the containers 700 during startup and/or operation of the containers 700 and storing the hot image files 811 required by the containers into the non-volatile memory 100 comprises:

identifying the file and file dependencies necessary for startup and/or operation of the mirror images by means of monitoring system calling, monitoring file variation, monitoring directory variation and monitoring progress during startup and/or operation of the container 700; and taking the file and file dependencies necessary for startup and/or operation of the mirror images just identified as the hot image file 811 required by the container 700. By using the disclosed method, the present invention at least provides the following technical benefits. First, opposite to static analysis that is focused on specific mirror image files, dynamic analysis can identify hot image files 811 that are more accurate. Second, there are well developed solutions for each of the foregoing operation, so the execution is very steady and efficient.

According to one preferred mode, during startup and/or operation of the containers 700, the purpose of analyzing the files and file dependencies required by startup and operation of the mirror images by monitoring system call, file variation, directory variation and process during startup and/or operation of the containers 700 may be to identify the files and file dependencies required by startup and/or operation of the containers 700. This is specifically considered from two aspects. First, inotify is used. Inotify is a mechanism for monitoring the file system. This mechanism can be used to monitor files and directories. In the event of variation of a file or a directory, the kernel 600 sends the variation of the file or the directory to an inotifyfile descriptor, and the event can be read by simply call read( ) at the application level. Second, strace is used. Strace is used to monitor system calls and received signals during the process. In Linux, a process has no direct access to hardware devices. When a process needs to access a hardware device (such as for reading a file in a hard drive), the system has to be switched to the kernel mode from the user mode, so that the hardware device can be accessed by means of system calls. Strace can monitor system calls generated by a process, including parameters, returned values and time consumed by execution.

According to one mode, the step sorting the mirror images in terms of access frequency according to at least numbers of times of access to the hot image files 811 so as to release the non-volatile memory 100 currently occupied by the mirror image having the lowest access frequency when the non-volatile memory 100 is short of storage space comprises: counting how many times the hot image files 811 corresponding to each said mirror image are accessed in a sampling cycle; recording magnitude of the hot image files 811 of each said mirror image; calculating a unit magnitude access ratio $R_{HS}$ of the hot image files 811 of each mirror image; sorting the mirror images in terms of access frequency according to the unit magnitude ratio $$R_{HS} = \frac{Ti}{Si};$$

and releasing the non-volatile memory 100 currently occupied by the mirror image having the lowest access frequency when the non-volatile memory 100 is short of storage space; where Ti is access a total number of the times all the hot image files 811 of the relevant mirror image have been accessed, and Si is a total magnitude of all the hot image files 811 of the relevant mirror image that have been accessed. Preferably, the sampling cycle ranges between 0.5 and 5 seconds. More preferably, the sampling cycle is 1 second. By using the disclosed method, the present invention can at least provide the following technical benefits. First, the present invention makes it easy to count access times and eliminates the need of complicated operation. Second, counting access times is a very regular operation, and the additional overhead introduced thereby is negligible. Third, the unit magnitude ratio is a useful indicator for describing access frequency. Fourth, the use of the non-volatile memory 100 is managed according to the access frequency, so that the most frequently accessed mirror images are resident in the non-volatile memory, thereby maximizing the value of the non-volatile memory 100.

Embodiment 2

The present embodiment discloses a method based on a heterogeneous memory for accelerating deployment and startup of containers, or an NVM-based performance acceleration method for containers, or a method for accelerating deployment and startup of containers, or an NVM-based method for enhancing performance of containers. The disclosed method may be implemented using the system of the present invention and/or other alternative components. For example, the method of the present invention can be implemented using components of the system of the present invention. Without causing conflicts or contradictions, a part of and/or the entire of a preferred mode of other embodiments can be used as complements to the present embodiment.

According to one preferred mode, the method may comprise steps of: division and storage of the mirror image; acquisition of hot image files 811; and/or reasonable scheduling.

Preferably, the step of division and storage of the mirror images may comprise: during deployment of the containers 700, classifying each image layer 810 of the mirror image as either an LAL or an LBL. The step of acquisition of hot image files 811 may comprise: during startup and operation of the containers 700, acquiring the hot image files 811 required by startup of the containers 700, storing them into the non-volatile memory 100, and writing other cold mirror image files in the non-volatile memory 100 back to the hard drive 200. The step of reasonably scheduling may comprise: when the non-volatile memory 100 is short of available capacity, replacing the hot image files 811 of the mirror image that are less frequently used in the non-volatile memory 100. By using the disclosed method, the present invention can at least provide the following technical benefit. When the storage space in the non-volatile memory 100 is insufficient, this approach makes the frequently used mirror images stored in the non-volatile memory 100, so as to ensure its startup and operation performance.

According to one mode, the method may comprise at least one of the following steps: classifying each image layer of mirror images 810 as either an LAL 810 (Layer above LDL) or an LBL 810 (Layer below LDL) during deployment of containers 700; storing the LALs 810 into a non-volatile memory 100 and selectively storing each said LBL 810 into one of the non-volatile memory 100 and a hard drive 200; acquiring hot image files 811 required by the containers 700 during startup and/or operation of the containers 700 and storing the hot image files 811 required by the containers 700 into the non-volatile memory 100; and sorting the mirror images in terms of access frequency according to at least numbers of times of access to the hot image files 811 so as to release the non-volatile memory 100 currently occupied by the mirror image having the lowest access frequency when the non-volatile memory 100 is short of storage space.

According to one preferred mode, the method may comprise at least one of the following steps:

Step S100: during deployment of the containers 700, classifying each image layer 810 in the mirror image as either an LAL or an LBL;

Step S200: during startup and/or operation of the containers 700, acquiring the hot image files 811 required by the containers 700 and storing the hot image files 811 required by the containers 700 into the non-volatile memory 100; and Step S300: sorting the mirror images in terms of access frequency at least according to the access times of the hot image files 811, so as to release the space occupied by the less frequently accessed mirror images when the available storage space in the non-volatile memory 100 is insufficient.

According to one preferred mode, Step S100 may comprise at least one of the following steps:

Step S110: identifying the location and capacity of the non-volatile memory 100 in a host;

Step S120: during deployment of the containers 700, identifying the LDL 810;

Step S130: checking whether each image layer 810 comprises sufficient hot image files 811; and/or Step S140: dividing he mirror images into LALs and LBLs according to the LDL, storing the LALs into the non-volatile memory 100 and selectively storing the LBLs into either the non-volatile memory 100 or the hard drive 200. Preferably, the purpose of identifying the location of the non-volatile memory 100 in the host may be to identify the storage path. Preferably, the purpose of identifying the capacity of the non-volatile memory 100 in the host may be to help to determine whether the remaining capacity of the non-volatile memory 100 is sufficient. By using the disclosed method, the present invention can at least provide the following technical benefits. First, the LALs are stored into the non-volatile memory 100, and this accelerates deployment of the containers 700. Second, the LBLs are selectively stored into either the non-volatile memory 100 or the hard drive 200, and this helps to save the space in the non-volatile memory 100.

Figure 3:
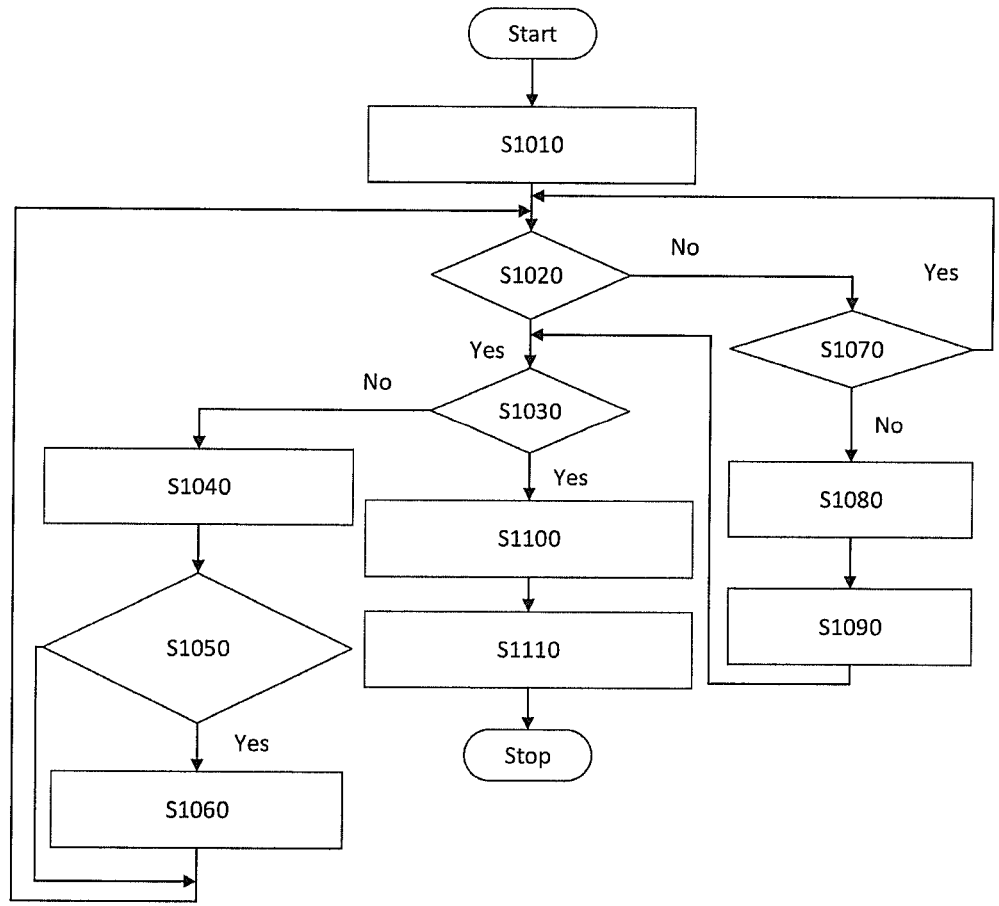
FIG. 3 is a detailed flowchart of division of a mirror image according to a method of the present invention.

According to another alternative, as shown in FIG. 3, Step S100 may comprise at least one of the following steps:

Step S1010: creating a stack, putting the image layers 810 into the stack in a decreasing depth order, and creating a blank linked list;

Step S1020: determining whether the stack is empty, and if yes, turning to Step S1030, or otherwise, turning to Step S1070;

Step S1030: determining whether the length of the linked list is 1, and if yes, turning to Step S1100, or otherwise, and turning to Step S1040;

Step S1040: deleting the downloaded nodes from the linked list, and then turning to Step S1050;
Step S1050: determining whether the parent mirror images corresponding to the nodes have been stored, and if yes, and turning to Step S1060, or otherwise, and turning to Step S1020;
Step S1060: storing the image layers 810 to the hard drive 200, and turning to Step S1020;
Step S1070: determining whether the length of the linked list is 3, and if yes, turning to Step S1020, or otherwise, turning to Step S1080;
Step S1080: popping and adding it to the end of the linked list, and turning to Step S1090;
Step S1090: waiting until an arbitrary image layer 810 has been fully downloaded, and turning to Step S1030;
Step S1100: taking the image layer 810 left in the linked list as the LDL, and turning to Step S110;
Step S1110: identifying LALs according to the LDL, and storing the LALs into the non-volatile memory 100; and
Step S1120: Ending. Preferably, since three threads are downloaded simultaneously when a container 700 pulling a mirror image, the maximum length of the linked list is 3. When the downloading is about to finish, there is only an LDL left, and the length of the linked list is 1. At this time, the LDL can be identified. By using the disclosed method, the present invention can at least provide the following technical benefits. First, with the use of the linked list having a length up to 3, the space overhead additionally introduced is quite small. Second, a linked list is a classic data structure, and its traversal and length determination are both convenient.

According to one preferred mode, in Sub-Step S110 of division and deployment of the mirror image, identifying location and capacity of the non-volatile memory 100 in the host requires kernel recompilation and addition of modules such as NVDIMM Support.

According to one preferred mode, in Step S120, identifying the LDL comprises during deployment of the containers 700 at least one of the following steps:
Step S121: building a double linked list, in which each node represents an image layer 810 that is being downloaded;
Step S122: after the image layer 810 is fully downloaded, if the linked list has a length greater than one, deleting the corresponding nodes from the linked list; and
Step S123: when the whole mirror image is fully pulled and there is only one node left in the linked list, determining that the image layer 810 corresponding to the node is the LDL. By using the disclosed method, the present invention can at least provide the following technical benefits. First, the LDL can be identified easily. Second, the linked list used is of a classic data structure, so the accuracy of the results can be assured.

According to one preferred mode, in the Sub-Step S130 of division and deployment of the mirror images, checking whether each image layer 810 has sufficient hot image files 811 comprises at least one of the following sub-steps:
Step S131: acquiring the context of command execution by a Docker daemon 500, and creating a buildFile object;
Step S132: reading DockerFile;
Step S133: performing line-by-line analysis on DockerFile, and determining whether there are sufficient hot image files 811 in the image layer 810 according to commands and contents of the DockerFile; and
Step S134: storing the image layers 810 that containing sufficient hot image files 811 into the non-volatile memory 100. By using the disclosed method, the present invention can at least provide the following technical benefits. First, coarse-grained hot image files, or the specific mirror image file as described above, can be obtained early. Second, in the process of downloading the mirror images 800, the image layers 810 containing specific mirror image files are stored into the non-volatile memory 100, and this helps to accelerate first startup of the containers 700.

According to one preferred mode, in Sub-Step S140, dividing the mirror images into two parts comprises at least one of the following sub-steps:
Step S141: taking the LDL as the threshold, identifying the image layers 810 having a depth lower than the last download layer 810 as LBLs, and storing the LBLs into the hard drive 200 for saving storage space in the non-volatile memory 100;
Step S142: taking the LDL as the threshold, identifying the image layers 810 having a depth higher than the last download layer 810 and the LDL itself as LALs to be stored into the non-volatile memory 100. LALs are the crux of occurrence of latency. By using the disclosed method, the present invention can at least provide the following technical benefits. First, by storing LALs into the non-volatile memory 100, deployment of the containers 700 can be accelerated. Second, since LBLs are not stored into the non-volatile memory 100, space occupancy in the non-volatile memory 100 can be reduced.

According to one preferred mode, in Step S200, acquiring the file hot image files 811 required by startup of the containers 700 comprises at least one of the following sub-steps:
Step S210: performing static analysis on DockerFile to acquire some information, wherein the commands are divided into the first type and the second type;
Step S220: performing string analysis to identify whether the image layers 810 contain hot image files 811, guiding deployment of the containers 700, preliminarily filtering out hot image files 811 and storing them into the non-volatile memory 100;
Step S230: performing dynamic analysis to acquire accurate hot image files 811 during startup and operation of the containers 700, wherein the dynamic analysis involves monitoring system calls, variations of files and directories, and process to identify the files and file dependencies required by the mirror images as the hot image files 811; and
Step S240: placing non-hot image files 811 in the non-volatile memory 100 back to the hard drive 200. Preferably, the commands of the first type modify the file system type of the images of the previous layer, such as FROM, ADD, COPY, RUN, etc. The commands of the second type only modify config information of the mirror images, such as ENV, EXPOSE, CMD, etc. By using the disclosed method, the present invention can at least provide the following technical benefits. First, the non-hot image files in the non-volatile memory 100 are placed back to the hard drive 200. This effectively saves storage space in the non-volatile memory 100 and the non-volatile memory 100 only holds the hot image files 811. Second, the contents of the mirror images 800 can be simply determined by means of analysis of the commands, making the present invention more efficient and convenient than the traditional method that scans the contents of the image layers 810.

According to one preferred mode, Step S200 may comprise at least one of the following steps:
Step S2010: acquiring DockerFile files of the mirror image;
Step S2020: analyzing DockerFile commands through string analysis;

Step S2030: tagging the image layers 810 corresponding to FROM, ADD, COPY, and RUN commands as candidate layers;

Step S2040: checking whether there is an execution engine or an application file in the candidate layer, and if yes, considering the image layer 810 as a coarse-grained hot image file 811, and storing it into the non-volatile memory 100;

Step S2050: during startup and operation of the containers 700, calling the application files required by Docker into the memory, wherein by monitoring system calls, variations of files and directories, and process, the file and file dependencies required by the mirror images can be identified and the hot image files 811 required by the containers 700 can be acquired; and Step S2060: storing the hot image files 811 into the non-volatile memory 100, and placing non-hot image file 811 in the non-volatile memory 100 back to the hard drive 200. By using the disclosed method, the present invention can at least provide the following technical benefit. The present invention effectively saves storage space in the non-volatile memory 100 and significantly reduces space occupancy in the non-volatile memory 100 because the non-volatile memory 100 only holds hot image files.

According to one preferred mode, Step S300 of reasonably scheduling comprises at least one of the following sub-steps:

Step S310: counting the access times of the hot image files 811 in each mirror image during the sampling cycle T, where in T is 0.5~5 seconds;

Step S320: according to the access times, sorting the hot image files 811 of each mirror image;

Step S330: when there is no sufficient space in the non-volatile memory 100, releasing the space in the non-volatile memory 100 occupied by the mirror images ranked last; and/or Step S340: repeating Step S330 until there is sufficient space in the non-volatile memory 100. By using the disclosed method, the present invention can at least provide the following technical benefits. First, the present invention provides an effective management strategy for use of a non-volatile memory by containers. Second, the hot image files 811 of each mirror image are sorted according to the access times, so the overhead additionally introduced is relatively small. Third, according to the rank of access times, the most frequently accessed hot image files 811 of the mirror image can be resident in the non-volatile memory 100, thereby maximizing the use value of the non-volatile memory 100.

According to one preferred mode, in Sub-Step S430, determining whether the image layer 810 contains sufficient hot image files 811 according to DockerFile command and contents comprises at least one of the following steps:

Step S431: determining whether the image layers 810 contain hot image files 811 according to DockerFile, if yes, turning to Step S433, or if no, turning to Step S432;

Step S432: in the event that the hot image files 811 of the image layer 810 only include Bin files or system dependencies, which take relative small parts in all hot image files 811, determining that the image layer 810 does not contain sufficient hot image files 811, and if the hot image files 811 of the image layer 810 include execution engines or application files, determining that the image layer 810 contains sufficient hot image file 811, and then turning to Step S433; and Step S433: ending.

According to one preferred mode, the serial numbers added to the steps of the method of the present invention are not intended to limit the operational sequence thereof, and a method described without the serial numbers shall also fall in the scope of the present invention.

The term "module" as used herein describes any type of hardware, software, or combination of software and hardware that is capable of performing the functions associated with "module."

It should be noted that the above specific embodiments are exemplary, and those skilled in the art can come up with various solutions inspired by the disclosure of the present invention, and these solutions also fall into the scope of the present disclosure and fall into the present Within the scope of the invention. Those skilled in the art should understand that the description of the present invention and the accompanying drawings are illustrative and do not limit the claims. The scope of protection of the present invention is defined by the claims and their equivalents.

What is claimed is:

1. A computation system, comprising:
   at least one processor;
   at least one storage; and
   at least one command, being stored in the at least one storage and configured to be executed by the at least one processor for operation;
   wherein, the operation comprises:
   classifying each image layer of mirror images as either an LAL (Layer above LDL (Last Download Layer)) or an LBL (Layer below LDL) during deployment of containers, including:
      finding an LDL during deployment of the containers according to download states of the image layers; and
      classifying the mirror images into the LALs and the LBLs using the LDL as a boundary;
      wherein, the LDL and the image layers above the LDL are classified as the LALs, and the image layers below the LDL are classified as the LBLs;
   storing the LALs into a non-volatile memory and selectively storing each said LBL into one of the non-volatile memory and a hard drive, including:
      analyzing a DockerFile corresponding to each said LBL so as to identify a status of a specific mirror image file contained in the relevant LBL;
      selectively storing the LBL to the hard drive if analysis of the DockerFile corresponding to the relevant LBL indicates that the relevant LBL does not contain any said specific mirror image files; and
      selectively storing the LBL into the non-volatile memory if analysis of the DockerFile corresponding to the relevant LBL indicates that the relevant LBL does contain a said specific mirror image file;
   acquiring hot image files required by the containers during startup and/or operation of the containers and storing the hot image files required by the containers into the non-volatile memory; and
   sorting the mirror images in terms of access frequency according to at least numbers of times of access to the hot image files so as to release the non-volatile memory currently occupied by the mirror image having the lowest access frequency when the non-volatile memory does not have storage space, including:
  counting how many times the hot image files corresponding to each said mirror image are accessed in a sampling cycle;
  recording magnitude of the hot image files of each said mirror image;
  calculating a unit magnitude access ratio RHS of the hot image files of each mirror image;
  sorting the mirror images in terms of access frequency according to the unit magnitude ratio $$R_{HS} = \frac{Ti}{Si};$$

and
  releasing the non-volatile memory currently occupied by the mirror image having the lowest access frequency when the non-volatile memory does not have storage space;
  where Ti is access a total number of the times all the hot image files of the relevant mirror image have been accessed, and Si is a total magnitude of all the hot image files of the relevant mirror image that have been accessed.

2. The computation system of claim 1, wherein the step of finding an LDL during deployment of the containers according to download states of the image layers further comprises:
  building a double linked list, in which each node represents one said image layer that is being downloaded;
  once the relevant image layer has been fully downloaded, and the double linked list has a length greater than one, deleting the node that corresponds to the image layer from the linked list; and
  when the whole mirror image has been pulled, and there is eventually one said node left in the double linked list, determining that the relevant image layer is the LDL.

3. The computation system of claim 2, wherein the step of analyzing a DockerFile corresponding to each said LBL so as to identify a status of a specific mirror image file contained in the relevant LBL further comprises:
  analyzing a command contained in the DockerFile corresponding to each said LBL;
  if there is any said command of a first type contained in the DockerFile corresponding to the relevant LBL, taking that LBL as a candidate LBL;
  if there is no said command of that first type contained in the DockerFile corresponding to the relevant LBL, determining that the relevant LBL does not contain any specific mirror image file;
  analyzing types of files in the DockerFile corresponding to each said selected candidate LBL;
  if the DockerFile corresponding to the relevant LBL among the candidate LBLs does not contain any execution engine and application file, determining that the relevant LBL does not contain a specific mirror image file; and
  if the DockerFile corresponding to the relevant LBL among the candidate LBLs does contain an execution engine and/or an application file, determining that the relevant LBL does contain the specific mirror image file;
  wherein the command of the first type is a command configured to modify contents of the mirror images to generate new image layers.

4. The computation system of claim 3, wherein the step of first analyzing the command contained
  in the DockerFile corresponding to each said LBL further comprises:
  acquiring a context for execution of the command through a Docker daemon, and creating a buildFile object;
  reading the DockerFile; and
  performing line-by-line analysis on the DockerFile so as to determine the status of the specific mirror image file contained in the relevant LBL according to the command and contents of the DockerFile.

5. The computation system of claim 1, wherein the step of acquiring hot image files required by the containers during startup and/or operation of the containers and storing the hot image files required by the containers into the non-volatile memory further comprises:
  identifying the file and file dependencies necessary for startup and/or operation of the mirror images by means of monitoring system calling, monitoring file variation, monitoring directory variation and monitoring progress during startup and/or operation of the container; and
  copying the file and file dependencies necessary for startup and/or operation of the mirror images just identified as the hot image file required by the container.

6. A non-volatile memory (NVM) based method for performance acceleration of containers, wherein the method comprises:
  classifying each image layer of mirror images as either an LAL (Layer above LDL(Last Download Layer)) or an LBL (Layer below LDL) during deployment of containers, including:
    finding an LDL during deployment of the containers according to download states of the image layers; and
    classifying the mirror images into the LALs and the LBLs using the LDL as a boundary;
    wherein, the LDL and the image layers above the LDL are classified as the LALs, and the image layers below the LDL are classified as the LBLs;
  storing the LALs into a non-volatile memory and selectively storing each said LBL into one of the non-volatile memory and a hard drive, including:
    analyzing a DockerFile corresponding to each said LBL so as to identify a status of a specific mirror image file contained in the relevant LBL;
    selectively storing the LBL to the hard drive if analysis of the DockerFile corresponding to the relevant LBL indicates that the relevant LBL does not contain any said specific mirror image files; and
    selectively storing the LBL into the non-volatile memory if analysis of the DockerFile corresponding to the relevant LBL indicates that the relevant LBL does contain a said specific mirror image file;
  acquiring hot image files required by the containers during startup and/or operation of the containers and storing the hot image files required by the containers into the non-volatile memory; and
  sorting the mirror images in terms of access frequency according to at least numbers of times of access to the hot image files so as to release the non-volatile memory currently occupied by the mirror image having the lowest access frequency when the non-volatile memory does not have storage space, including:
    counting how many times the hot image files corresponding to each said mirror image are accessed in a sampling cycle;

recording magnitude of the hot image files of each said mirror image;

calculating a unit magnitude access ratio RHS of the hot image files of each mirror image;

sorting the mirror images in terms of access frequency according to the unit magnitude ratio $$R_{HS} = \frac{Ti}{Si};$$

and releasing the non-volatile memory currently occupied by the mirror image having the lowest access frequency when the non-volatile memory does not have storage space;

where Ti is access a total number of the times all the hot image files of the relevant mirror image have been accessed, and Si is a total magnitude of all the hot image files of the relevant mirror image that have been accessed.

* * * * *